United States Patent
Trauring

(10) Patent No.: US 6,513,033 B1
(45) Date of Patent: Jan. 28, 2003

(54) COLLABORATIVE UPDATING OF COLLECTION OF REFERENCE MATERIALS

(75) Inventor: Philip Trauring, 23 Leicester St., Brookline, MA (US) 02445

(73) Assignee: Philip Trauring, Brookline, MA (US)

( * ) Notice: Subject to any disclaimer, the term of this patent is extended or adjusted under 35 U.S.C. 154(b) by 0 days.

(21) Appl. No.: 09/457,015

(22) Filed: Dec. 8, 1999

(51) Int. Cl.[7] ............................................. G06F 17/30
(52) U.S. Cl. ............................ 707/3; 707/10; 707/103
(58) Field of Search ............................ 707/2, 3, 102, 707/103 R, 10, 532

(56) References Cited

U.S. PATENT DOCUMENTS

| | | | |
|---|---|---|---|
| 5,297,038 A | 3/1994 | Saito | 707/1 |
| 5,642,522 A | 6/1997 | Zaenen et al. | 707/532 |
| 5,649,221 A | 7/1997 | Crawford et al. | 705/4 |
| 5,745,776 A | 4/1998 | Sheppard, II | 707/532 |
| 5,857,181 A * | 1/1999 | Augenbraum et al. | 707/2 |
| 5,875,443 A | 2/1999 | Nielsen | 707/2 |
| 5,991,756 A * | 11/1999 | Wu | 707/3 |
| 6,038,560 A * | 3/2000 | Wical | 707/5 |
| 6,092,080 A * | 7/2000 | Gustman | 707/103 |
| 6,170,011 B1 * | 1/2001 | Macleod Beck et al. | 709/224 |
| 6,212,527 B1 * | 4/2001 | Gustman | 707/102 |

OTHER PUBLICATIONS

The Internet Dictionary Project; http://www.june29.com/~chambers/IDP/.
Lexical Freenet; http://www.link.cs.cmu.edu/lexfn/.
The Internet Movie Database; http://www.imdb.com.

* cited by examiner

*Primary Examiner*—Diane D. Mizrahi

(57) ABSTRACT

A method, apparatus, and article of manufacture for collaborative of collection of reference materials. A comprehensive reference material is dynamically updated by using input received from one or more users.

30 Claims, 10 Drawing Sheets

COLLABORATIVE UPDATING OF COLLECTION OF REFERENCE MATERIALS

BACKGROUND OF THE INVENTION

1. Field of the Invention

This invention relates in general to on-line reference materials, and, in particular, to a technique for dynamically creating on-line, comprehensive reference materials.

2. Description of Related Art

Dictionaries, encyclopedias, and other reference materials contain comprehensive information about a particular branch of knowledge. For example, dictionaries contain information about words, including information about their form, pronunciations, functions, and meanings. Encyclopedias contain information about a particular subject, including details about the history of a topic or subject.

Generally, these reference materials are published works that are updated annually, semi-annually, or within a defined period of time. Publishers, editors, and/or authors (collectively referred to as "authors") typically control the content of the initial reference material and the content of the subsequent versions of the reference material.

By contrast, readers of the reference materials seldom control either the content of the initial reference material or the content of the subsequent versions. There have been situations, however, in which readers submit their personal views about information contained in a reference material to the authors. When the authors review and analyze the accuracy of the submitted information, they determine whether to update subsequent versions of the reference materials. Of course, the authors are under no obligation to even consider the views of the reader, much less to update a subsequent version based on a readers submission. Hence, the authors could conceivably exclude the views of all readers from the reference materials. Such behavior can create a plethora of reference books that are limited in scope and breadth because they only contain the views of a handful of people—the authors.

In this age of information technology, an abundance of these reference materials are located on the Internet. The Internet is a type of global computer network that offers a vast amount of information to a multitude of diverse computer users. Via its networks, the Internet enables many users from different geographical locations to access information stored in data sources (e.g., databases) that are located around the world. The World Wide Web (WWW or the web) is the fastest growing part of the Internet. The WWW is a system of Internet servers that support specifically formatted documents (e.g., HTML documents). These documents include, but are not limited to, electronic versions of reference materials.

There are many electronic versions of reference materials, such as dictionaries, encyclopedias, and almanacs. These reference materials are made up of data files. The data files may be text files or multimedia files. Exemplary reference materials are the American Heritage Talking Dictionary, Britannica Online, and the Baseball Almanac. Like the reference materials discussed above, these electronic versions are updated infrequently, and the updates are controlled by the authors, and not by the computer users.

A number of patents have issued for various electronic reference materials. Most of these patents are related to retrieving words and information about words from an electronic dictionary (U.S. Pat. Nos. 5,649,221, 5,745,776, 5,642,522, and 5,297,038). The content of these electronic dictionaries are also controlled by the authors, and not the computer user.

One patent entitled "Internet-based Spelling Checker Dictionary System With Automatic Updating," U.S. Pat. No. 5,875,443 ('443 patent), discloses a technique that allows a computer user to submit correctly and incorrectly spelled words to the authors of the spelling dictionary. The authors determine whether the word is an approved word. All approved words are added to the spelling dictionary, and the updated spelling dictionary in periodically distributed to users.

The technique disclosed in the '443 Patent tends to expand the scope and breadth of the spelling dictionary because the authors are willing to update the dictionary based on input from users. Therefore, unlike the handful of authors who tended to control the content of traditional reference materials, the '443 patent discloses a collaborative effort between computer users and authors of the spelling dictionary. Yet, the technique disclosed in the '443 patent has two major limitations.

First, the technique is narrowly directed to providing correctly spelled words. For users that wish to obtain a broad spectrum of information, the spell checker dictionary is worthless. The spell checker dictionary lacks word definitions and topic and subject descriptions. Further, conventional spelling dictionaries, like the one disclosed in the '443 patent, lack multimedia files. Instead, they are frequently composed of text files that contain nothing more than the correct (or incorrect) spelling of a word.

Second, the '443 patent involves the periodical distribution of updated spelling dictionaries. Users are required to wait for an unspecified length of time before receiving updates. As a result, the users are virtually forced to use outdated spelling information until the next distribution cycle.

Thus, what is needed is a technique for dynamically updating on-line, comprehensive reference material.

SUMMARY OF THE INVENTION

To overcome the limitations in the prior art described above, and to overcome other limitations that will become apparent upon reading and understanding the present specification, the present invention discloses a method, apparatus, and article of manufacture for creating on-line, comprehensive reference materials.

In accordance with the present invention. A comprehensive reference material is dynamically updated by using an input received from one or more users.

The present invention has utility for dynamically updating an online, comprehensive reference material based on user input.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

To facilitate an understanding of the present invention, a glossary of terms specific to the present invention is included below.

Glossary

Topic—the concept being defined by the system

Definition—a description of the topic, either written or multimedia

Existing Definition—the combined list of established and fledgling definitions, i.e. all definitions on the definition list except the alternative definitions.

Established Definition—definitions that have passed the establishment threshold.

Fledgling Definition—definitions that have not passed the establishment threshold.

Alternate Definition—a definition associated with an existing definition, suggested as a replacement. If it passes the replacement threshold then it replaces the existing definition that it was associated with.

Definition List—all definitions associated with a topic, including established and fledgling definitions, and their associated alternate definitions.

Existing/Alternate Definition Pair—An existing definition and the alternate definition linked to it.

Hardware Environment

Figure 1:
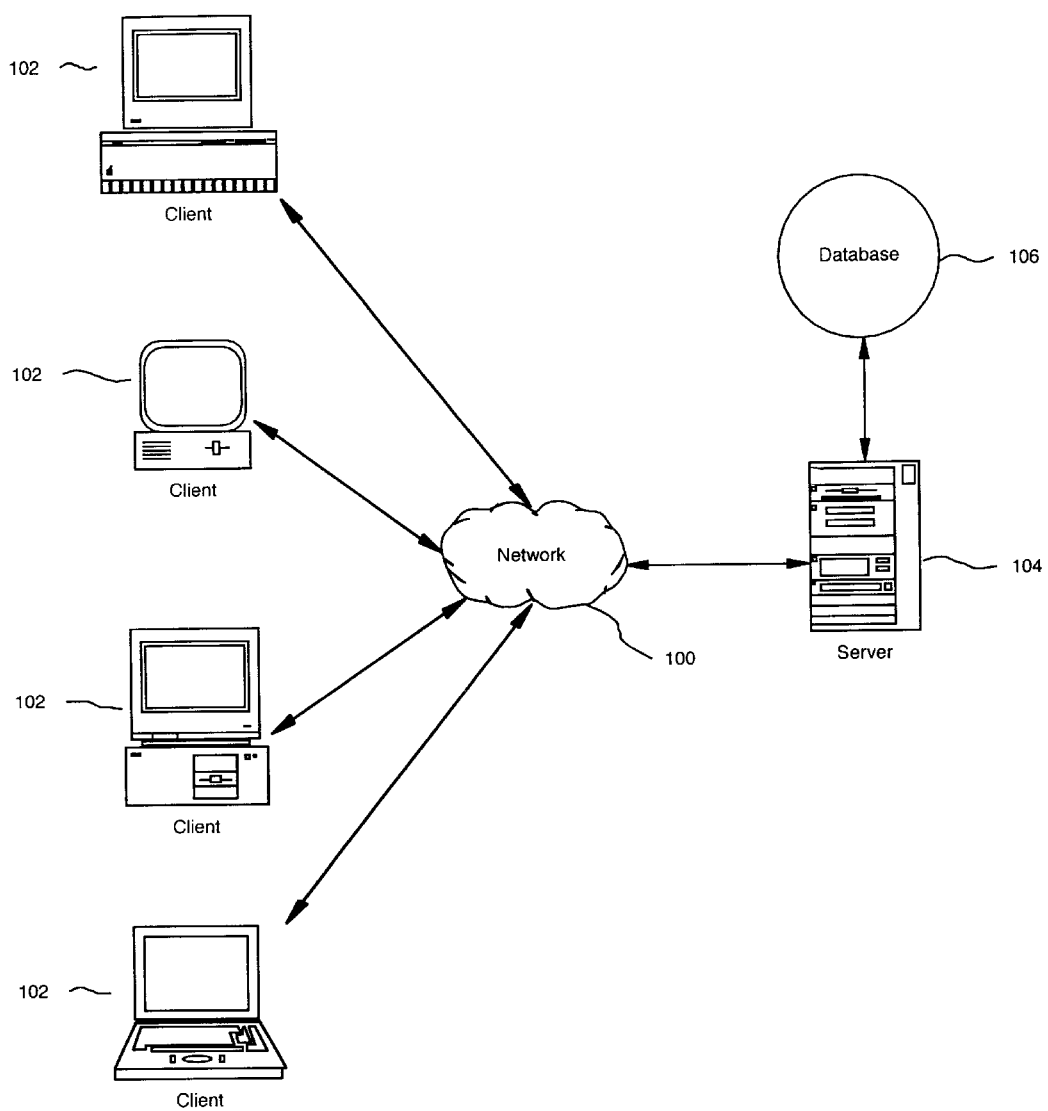
FIG. 1 schematically illustrates a hardware environment of a preferred embodiment of the present invention, and more particularly, illustrates a typical distributed computer system.

FIG. 1 schematically illustrates the hardware environment of a preferred embodiment of the present invention, and more particularly, illustrates a typical distributed computer system using the network 100 to connect client computers 102 executing client applications to a server computer 104 executing software and other computer programs, and to connect the server system 104 to data sources 106. A data source 106 may comprise, for example, a multi-media database. A typical combination of resources may include client computers 102 that are personal computers or workstations, and a server computer 104 that is a personal computer, workstation, minicomputer, or mainframe. These systems are coupled to one another by various networks, including LANs, WANs, SNA networks, and the Internet.

A client computer 102 typically executes a client application and is coupled to a server computer 104 executing server software. The client computer 102 is bi-directionally coupled with the server computer 104 over a line or via a wireless system. In turn, the server computer 104 is bi-directionally coupled with data sources 106. Those skilled in the art will recognize the data sources 106 can exist within server computer 104 and does not need to be connected externally.

Figure 2:
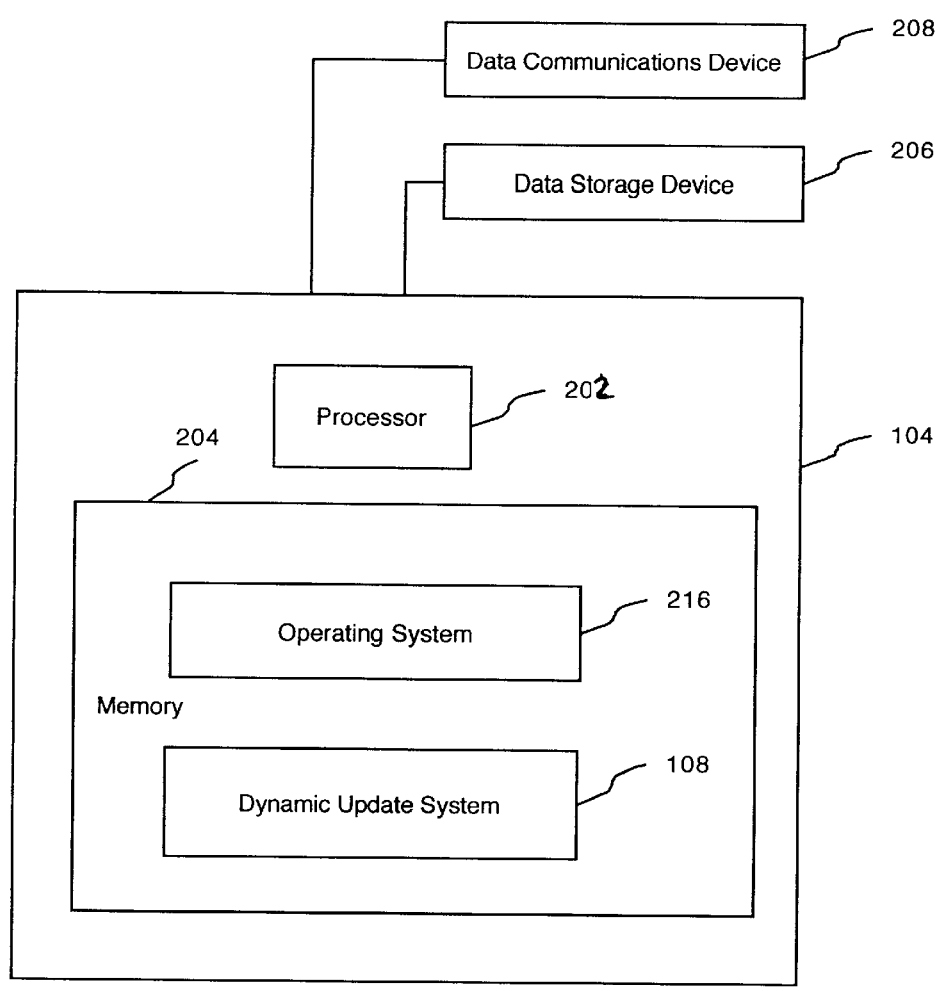
FIG. 2 schematically illustrates a server computer that is used with a preferred embodiment of the present invention.

FIG. 2 shows an exemplary server computer. The server computer 104 generally comprises a processor 202, random access memory (RAM) 204, data storage devices 206 (e.g., hard drive, floppy, and/or CD-ROM disc drives, etc.), data communication devices 208 (e.g., modems, network interfaces, etc.). It is envisioned that, attached to the server computer 104 may be other devices such as a local area network (LAN) or wide area network (WAN), a video card, and a bus interface. The server computer 104 operates under the control of an operating system 216 stored in the memory. Those skilled in the art will recognize that any combination of the above components, or any number of different components, peripherals, and other devices, may be used with the server computer 104.

The present invention is preferably implemented in one or more computer programs or applications (hereinafter referred to as the dynamic update system 108). The dynamic update system 108 updates on-line, comprehensive reference materials by incorporating input from a user. The operating system 216 controls the execution of the dynamic update system 108. Under the control of the operating system 216, the dynamic update system 108 may be loaded from the data storage device 206, and/or remote devices into the memory 204 of the server computer 104 for use during actual operations. Generally, the operating system 216 and the dynamic update system 108 are tangibly embodied in and/or readable from a device, carrier, or media, and/or remote devices coupled to the server computer 104 via the data communication device 208.

Those skilled in the art will recognize that the exemplary hardware environments illustrated in FIGS. 1 and 2 are not intended to limit the present invention. Indeed those skilled in the art will recognize that other alternative hardware environments may be used without departing from the scope of the present invention.

On-Line, Comprehensive Reference Materials

The disclosed embodiment of the present invention provides a dynamic update system 108 for dynamically updating on-line, comprehensive reference materials. The phrase dynamically updating refers to updating on-line, comprehensive reference material during the runtime of the dynamic update system 108. Comprehensive reference materials are collections of any branch of knowledge. These materials include, but are not limited to, dictionaries, encyclopedias, almanacs, and thesauri. Indeed, those skilled in the art will recognize that other reference materials that contain a collection of knowledge may be used without departing from the scope of the present invention. Electronic versions of these reference materials contain text files and multimedia files.

The present invention includes two advantageous features. The first feature is directed to displaying comprehensive reference material to a user. The second feature is directed to dynamically updating the comprehensive reference material by incorporating input from a user.

The first feature of the present invention involves preparing the comprehensive reference material for display and displaying the comprehensive reference material based on display instructions from a user. The reference material contains topics and definitions. A topic is the subject (e.g., word, phrase, symbol, etc.) that is defined and/or described by the definitions. Definitions are the smallest unit of a reference material. To illustrate, assume that the topic is the noun form of the word flower. The corresponding definition is a word definition, such as "a plant cultivated for its blossoms." It is noted that, definitions can be text files or multimedia files.

Regarding the topics, the dynamic update system 108 receives the topics from the user. The dynamic update system 108 stores these received topics in a data source 106 (e.g., a database). Before storing the received topics in the data source 106, the dynamic update system 108 ensures that the received topic is a unique topic. More specifically, the dynamic update system 108 compares the received topic with the previously stored topics (also referred to as existing topics). When there is match between the received topics and the existing topics, the dynamic update system 108 provides the user with the option of viewing one of the existing topics instead of creating a new topic. When the user wishes to view one of the existing topics, the dynamic update system 108 displays the existing topic.

The dynamic update system 108 also compares the received topics with similar existing topics. By way of example, if a user wanted to create a topic "flowery" the system might return "flower," "floweret" and "flour", as these are similarly spelled and/or similar-sounding. The dynamic update system 108 displays these existing topics to the user, allowing the user to view similar topics (in case the user intended to enter one of the existing topics).

After viewing the similar topics, the user decides either to accept one of the similar topics (if they recognize the similar topic as correct) or to add the topic they originally submitted to the data source 106. When the user decides to add the topic, the dynamic update system 108 dynamically updates the reference material by adding the received topic to the data source 106. The dynamic update system 108 then prompts the user for a definition that defines and/or describes the topic.

Figure 3:
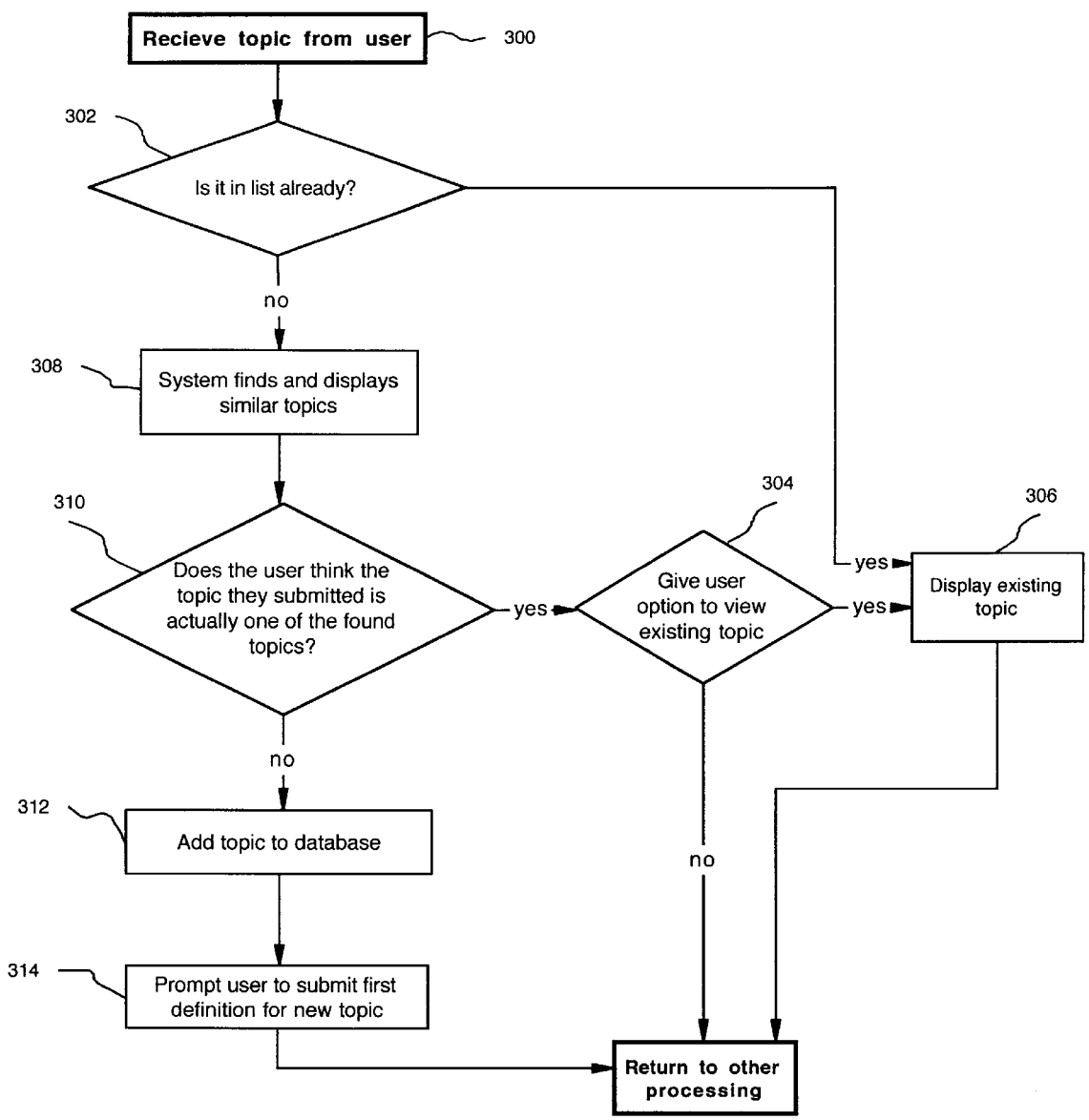
FIG. 3 is a flowchart that illustrates the steps performed by the dynamic update system when evaluating a topic in accordance with an embodiment of the present invention.

FIG. 3 is a flowchart that illustrates the dynamic update system 108 evaluating a topic in accordance with an embodiment of the present invention. Block 300 represents the dynamic update system receiving a topic from a user. Block 302 is a decision block that represents the dynamic update system 108 determining whether the exact topic already exists in the data source 106. When the exact topic already exists, the dynamic update system 108 displays the existing topic, as represented by block 306. Otherwise, the dynamic update system 108 proceeds to block 308.

Block 308 represents the dynamic update system 108 searching for and displaying similar topics that already exist in the data source 106. The dynamic update system 108 then proceeds to block 310.

Block 310 is a decision block that represents the dynamic update system 108 determining whether the user accepted one of the similar topics. When the user accepts one of the similar topics, the dynamic update system 108 give the user the option of viewing the existing topic as represented by block 304. Otherwise, the user proceeds to block 312.

Block 312 represents the dynamic update system 108 dynamically updating the reference material by adding the topic to the data source 106. Once the topic is added to the data source 106, the dynamic update system prompts the user for a definition, as represented by block 314.

Indeed, those skilled in the art will recognize that other means of receiving (or gathering) topics may be used without departing from the scope of the present invention. For instance, the dynamic update system 108 could retrieve topics from a myriad of sources, including, but not limited to, on-line reference sources, hard copy reference sources, web pages, news paper, or any other information source.

With respect to the definitions, each definition is located on a definition list. Users provide some or all of the definitions located on the definition list. Definitions that are provided by users are user-defined definitions. The dynamic update system 108 dynamically updates the reference material by adding the user-defined definition to the definition list.

First, the dynamic update system 108 receives a user-defined definition from a user. The dynamic update system 108 then determines whether the exact definition already exists in the data source 106. When the exact definition already exists in the data source, the dynamic update system 108 rejects the definition and returns an error message to the user. Otherwise, the dynamic update system 108 determines whether a similar definition already exists in the data source 106.

When a similar definition already exists, the dynamic update system 108 queries the user to see if any of the similar definitions found are indeed the same as the one they are submitting. If the user indicates that one of the found definitions is the same, then the user's definition is rejected. Otherwise, the dynamic update system 108 verifies that the definition is acceptable (e.g., performs a spell check for text definitions). When the definition is acceptable, the dynamic update system 108 adds the definition to the definition list for an existing topic.

Figure 4A:
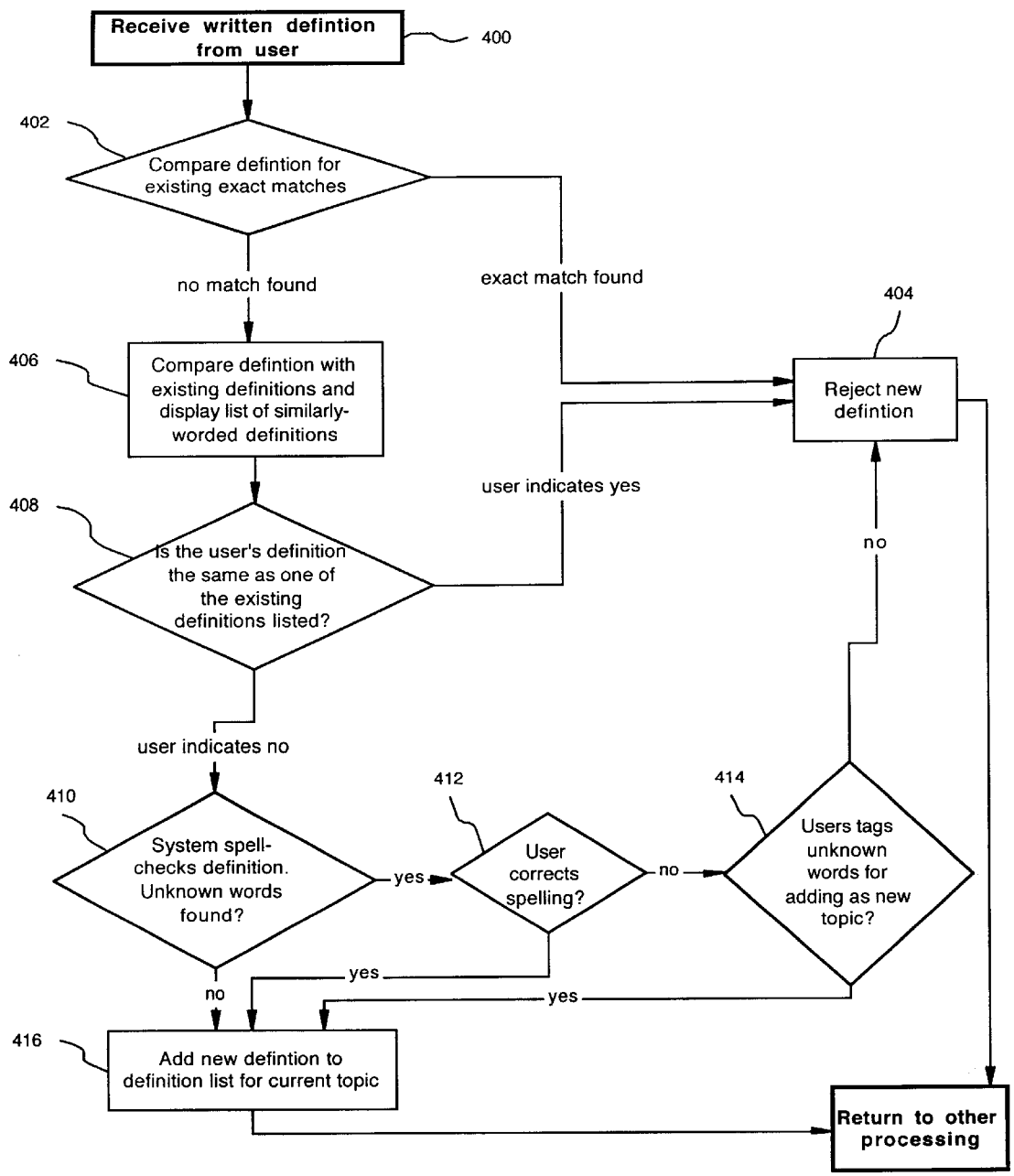
FIGS. 4A–4B illustrate the steps performed by the dynamic update system when receiving user-defined definitions.

FIG. 4A is flowchart that illustrates the steps performed by the dynamic update system 108 when receiving user-defined definitions, in accordance with an embodiment of the present invention. The flowchart in FIG. 4A assumes that the definition is a text file that contains written definitions. Block 400 represents the dynamic update system receiving a text definition from a user.

Block 402 is a decision block that represents the dynamic update system 108 determining whether the exact definition already exists on the definition list. When the exact definition exists, the dynamic update system 108 proceeds to block 404. Otherwise, the dynamic update system 108 proceeds to block 406.

Block 404 represents the dynamic update system 108 rejecting the definition. The dynamic update system 108 then returns to other processing.

Block 406 represents the dynamic update system 108 searching for and displaying similarly worded definitions. The dynamic update system then proceeds to block 408.

Block 408 is another decision block that represents the dynamic update system 108 querying the user to see if the user thinks that any of the definitions found from the processing in block 406 are indeed the same as the definition that the user is proposing. If the user agrees that one of the existing definitions is the same, then the dynamic update system proceeds to block 404, rejecting the user-submitted definition. Otherwise, the dynamic update system 108 proceeds to block 410.

Block 410 is another decision block that represents the dynamic update system 108 spell checking the definition. If the spell-check process finds unknown words, then the dynamic update system proceeds to block 412. Otherwise, the dynamic update system proceeds to block 416.

Block 412 is decision block that queries the user, allowing them to correct the spelling of unknown words in the definition. If the user corrects all of the unknown words, then the dynamic update system 108 proceeds to Block 416. Otherwise, the dynamic update system 108 proceeds to block 414.

Block 414 is a decision block that allows the user to tag unknown words for adding as new topics in the system later. If the user does not tag the remaining unknown words to be added as new topics, then the dynamic update system proceeds to block 404, rejecting the definition. Otherwise, the dynamic update system 108 proceeds to block 416.

Block 416 represents the dynamic update system adding a new definition to the definition list. The dynamic update system 108 then returns to other processing.

Figure 4B:
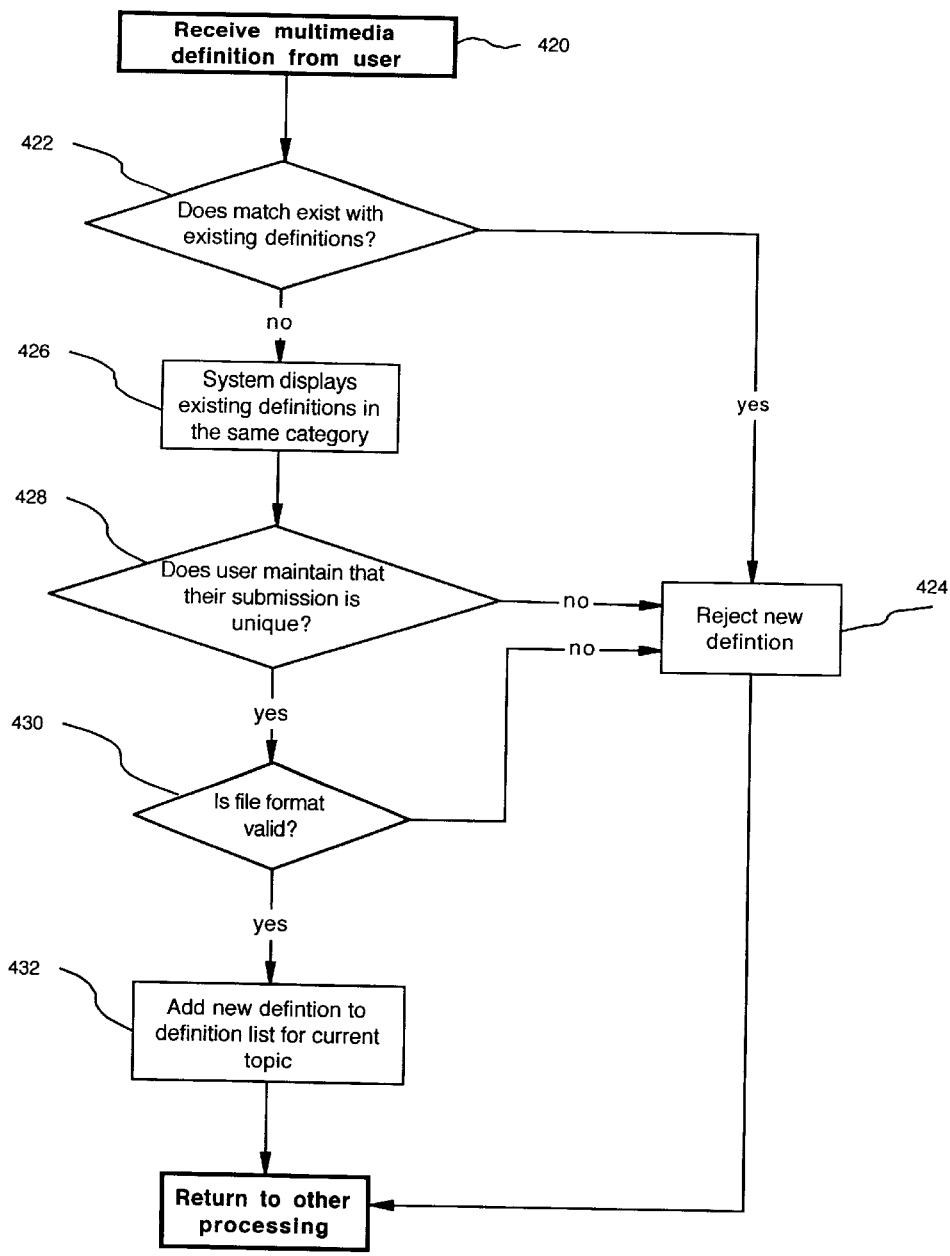

FIG. 4B is flowchart that illustrates the steps performed by the dynamic update system 108 when receiving user-defined definitions, in accordance with an embodiment of the present invention. The flowchart in FIG. 4B assumes that the definition is multimedia file that contains definitions in the form of image, sound, video or other multimedia formats. Block 420 represents the dynamic update system 108 receiving a multimedia definition from a user.

Block 422 is a decision block that represents the dynamic update system 108 determining whether the exact definition already exists on the definition list. When the exact definition exists, the dynamic update system 108 proceeds to block 424. Otherwise, the dynamic update system 108 proceeds to block 426.

Block 424 represents the dynamic update system 108 rejecting the definition. The dynamic update system 108 then returns to other processing.

Block 426 represents the dynamic update system 108 searching for similar multimedia definitions of the same type and displaying them to the user. The dynamic update system 108 then proceeds to block 428.

Block 428 is another decision block that represents the dynamic update system 108 querying the user to see if the user thinks that any of the definitions found from the processing in block 426 are indeed the same as the definition the user is proposing. If the user agrees that one of the existing definitions is the same, then the dynamic update system proceeds to block 424, rejecting the user-submitted definition. Otherwise, the dynamic update system 108 proceeds to block 430.

Block 430 represents the dynamic update system adding a new multimedia definition to the definition list. The dynamic update system 108 then returns to other processing.

In one embodiment of the present invention, the dynamic update system 108 initializes the topic list and connected definition lists by adding content from traditional reference materials. The traditional reference materials may include such reference works as Webster's Revised Unabridged Dictionary or any other reference work. In this embodiment, the initial topics and connected definition lists are generated from an outside reference work. The remaining topics and associated definitions, are created and modified by the users of the system. In another embodiment of the present invention, the dynamic update system 108 begins with no topics or associated definitions. In this embodiment, all topics and definitions are generated solely by users of the system.

Once the definition list is initialized, the dynamic update system 108 dynamically updates the reference material by adding user-defined definitions. In contrast to traditional reference materials, the definition list is not created by a handful of authors. Rather, the topics and the definitions are provided by the users. The process for adding user-defined definitions to the definition list is discussed below.

The definition list is partitioned into two virtual sub-lists, an established definition sub-list and a fledgling definition sub-list. All definitions, when first added to the system, start out as fledgling definitions. The dynamic update system 108 moves definitions from fledgling status to the established definition sub-list when the definitions pass the establishment threshold. The establishment threshold has one or more requirements that a definition must fulfill before the dynamic update system 108 places the definition on the established definition sub-list. The requirements are related to votes that the dynamic update system 108 receives from users.

In one embodiment of the present invention, the establishment threshold has two requirements. First, a definition must receive a pre-defined number of votes (e.g., 100 total votes). Second, a definition must have a pre-defined ratio of positive and negative votes (e.g., a 3:1 ratio). When the definition fulfills both of the establishment threshold requirements, the dynamic update system places the definition on the established definition sub-list. Regarding the pre-defined number of votes, the dynamic update system 108 sums the number of votes that each definition receives from users, and compares the total number of votes to the establishment threshold requirement. When the total number of votes is equal to or greater than the first establishment threshold requirement, the dynamic update system 108 checks for the second establishment threshold requirement. Otherwise, the dynamic update system 108 places the definition on the fledgling definition sub-list.

With respect to the second establishment threshold requirement, the dynamic update system 108 tracks the number of positive and negative votes for each definition and calculates the ratio of positive and negative votes. As used herein, a positive or negative vote is an indication of a user's approval or disapproval of a particular definition. Additionally, within a group of definitions, a positive vote is an indication that a user prefers a particular definition over other definitions. By contrast, a negative vote is an indication that a user disfavors a particular definition. Positive votes may be represented by "+1", "yes," or any commonly used representation. Negative votes may be represented by "−1", "no," or any commonly used representation. When the pre-defined ratio of positive and negative votes is equal to or greater than the second establishment threshold requirement, the dynamic update system places the definition on the established definition sub-list. Otherwise, the dynamic update system 108 places the definition on the fledgling definition sub-list. It is noted that, the majority of users who have voted, as defined by the establishment threshold, prefer the definitions that are located on the establishment definition sub-list.

In one embodiment of the present invention, the establishment threshold is set by the developer of the dynamic update system 108. In particular, the developer performs a series of tests to determine which threshold value increases the dynamic update system's 108 ability to optimize the calculation of votes and to optimize the placement of definitions on sub-lists. Indeed, those skilled in the art will recognize that other alternative techniques for setting the threshold may be used without departing from the scope of the present invention, such as allowing a user to input a threshold value.

Figure 5A:
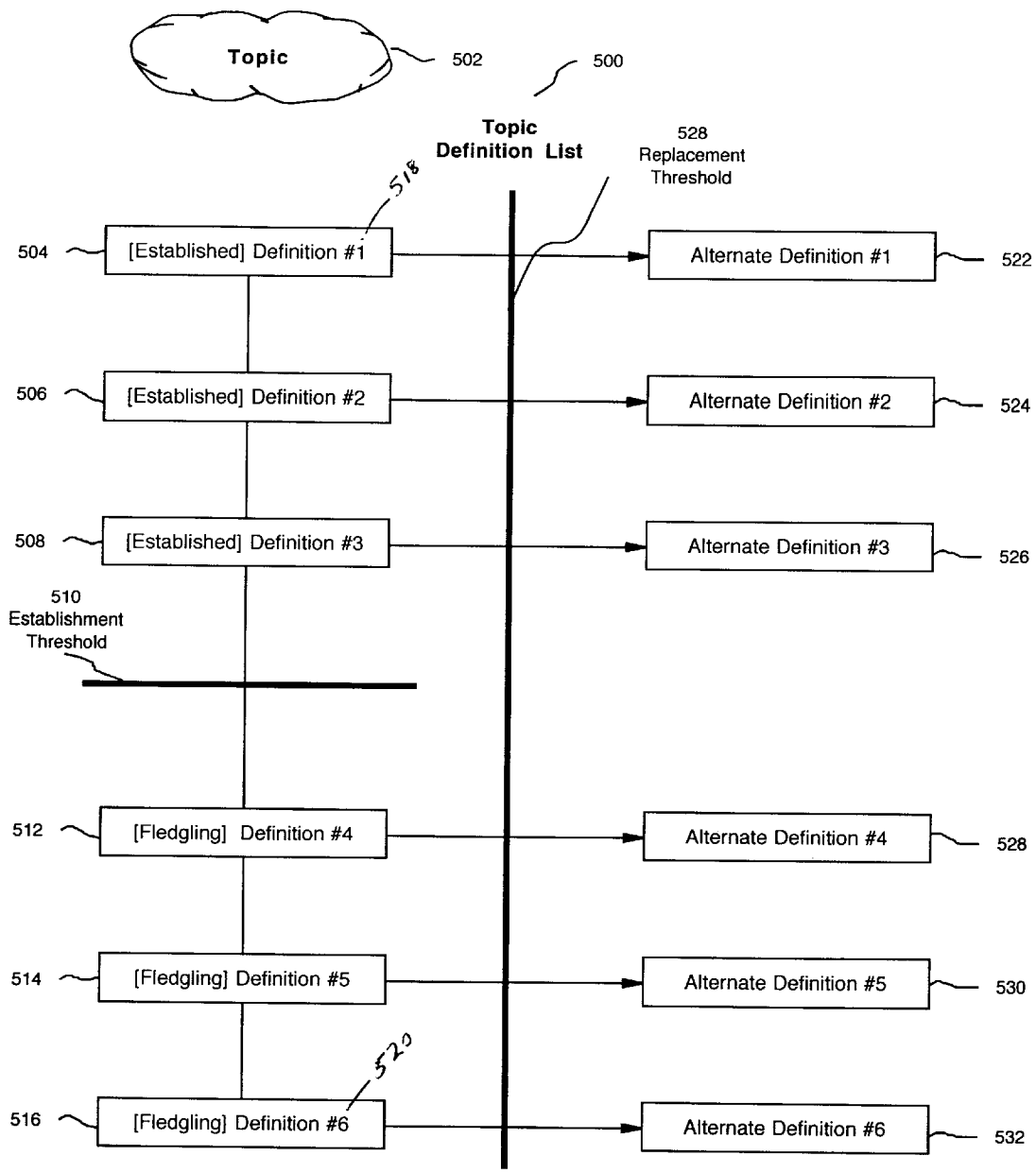
FIGS. 5A–5B illustrate definition lists that are used in accordance with an embodiment of the present invention.

FIG. 5A illustrates a definition list 500 that is used with a preferred embodiment of the present invention. In FIG. 5A, the topic is a word topic 502. The established definitions 504, 506, and 508 are located above the establishment threshold 510. The fledgling definitions 512, 514, and 516 are located below the establishment threshold 510. Each definition has a ranking number associated with it. The ranking number is related to the number of votes that each definition received and to the ratio of positive and negative votes that each definition received. For example, the box that represents the established definition 504 contains "#1" 518 as its ranking number. The "#1" 518 indicates that the established definition 504 received the highest number of votes and/or the highest ratio of positive and negative votes. On the other hand, the box that represents the fledgling definition 516 contains a "#6" 520 as its ranking number. The "#6" 520 indicates that the fledgling definition 516 received the lowest number of votes and/or the lowest ratio of positive and negative votes.

The following paragraphs describe the voting process for the established and fledgling definitions (collectively referred to as "existing definitions"). First, the dynamic update system 108 receives an input from a user. The input contains one existing definition (hereinafter referred to as the user-selected definition) and an indication that the users wishes to vote on the user-selected definition. The dynamic update system 108 then determines whether the user-selected definition is an established definition.

When the user-selected definition is an established definition, the dynamic update system 108 displays all established definitions, including the user-selected definition. The dynamic update system 108 arranges the established definitions on the monitor screen so that the user-selected definition is isolated from the remaining established definitions. The dynamic update system 108 can isolate the user-selected definition by locating it away from the remaining established definitions or by highlighting the user-selected definition or by using any known method of separating one portion of data from another portion of data. Isolating the user-selected definition from the remaining established definitions allows the user to perform a one-to-one comparison between the user-selected definition and the remaining established definitions.

When the user-selected definition is a fledgling definition, the dynamic update system 108 displays all established definitions and the selected fledgling definition, for comparison. The dynamic update system 108 arranges the established definitions so that the user-selected definition is isolated from the established definitions. Isolating the user-selected definition from the remaining existing definitions allows the user to perform a one-to-one comparison between the user-selected definition and the established definitions.

Next, the dynamic update system 108 receives a vote from a user. The received vote is positive when the user determines that the user-selected definition is accurate and unique. On the other hand, the received vote is negative when the user determines that the user-selected definition is inaccurate and/or similar to an established definition.

The dynamic update system 108 then calculates the total number of votes received by users and re-orders the definition list (if necessary). Re-ordering the definition list involves determining whether a definition is located on the fledgling definition sub-list or on the established definition sub-list. Re-ordering the reference list also involves determining whether the rank number is correct.

Figure 6:
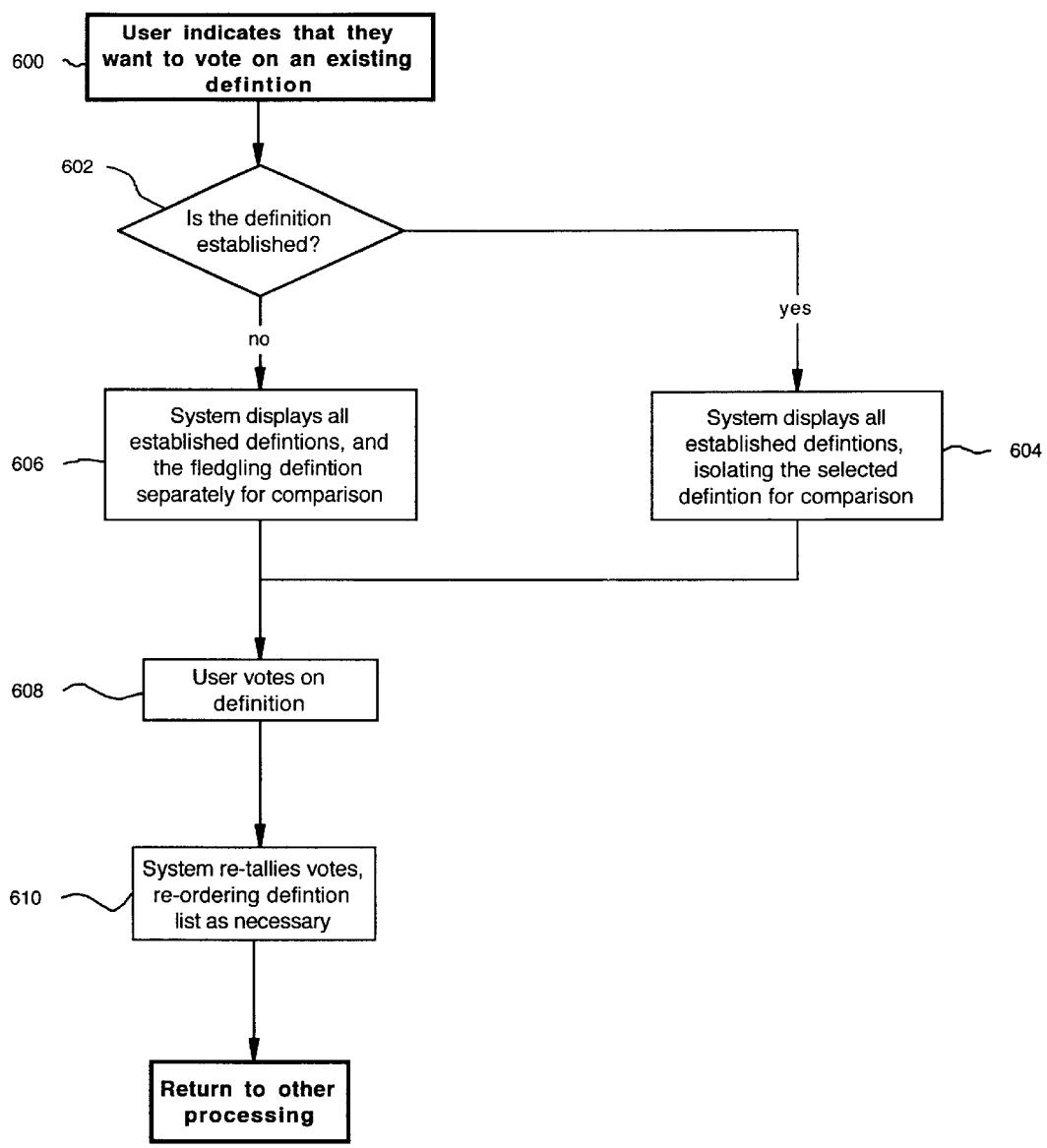
FIG. 6 is a flowchart that illustrates the steps performed by the dynamic update system when calculating the votes received from users in accordance with an embodiment of the present invention.

FIG. 6 is a flowchart that represents the dynamic update system 108 calculating the votes received from users in accordance with an embodiment of the present invention. Block 600 represents the dynamic update system 108 receiving an input from a user. The input contains an indication that a user wishes to vote on a particular definition. Block 602 is a decision block that represents the dynamic update system 108 determining whether the user-selected definition is located on the established definition sub-list. When the user-selected item is located on the established definition sub-list, the dynamic update system 108 displays all the established definitions, isolating the user-selected definition from the remaining established definitions, as represented by block 604. Otherwise, the dynamic update system proceeds to block 606.

Block 606 represents the dynamic update system 108 displaying all of the established reference in tandem with the user-selected fledgling definition. The dynamic update system 108 isolates the established definitions from the fledgling definitions. The dynamic update system 108 then receives a vote from the user, as represented by block 608. Block 610 represents the dynamic update system calculating the total number of votes from users and re-ordering the definition list (if necessary).

The dynamic update system 108 prohibits users from voting multiple times for the same definition. In particular, before voting on a user-selected definition, each user must provides a user identification number (ID) (e.g., password) . When the user votes on the user-selected definition, the dynamic update system 108 attaches a link to the definition of the user's ID. The dynamic update system 108 stores this attached information in the data source 106. The dynamic update system 108 uses the stored, attached information to verify that the user has not previously voted on the user-selected definition. More specifically, when a user attempts to vote on a definition, the dynamic update system 108 compares the user's ID to the stored, attached information. When a match exists between the user's ID and the stored, attached information, the dynamic update system 108 returns an error message to the user, indicating that the user has already voted on the definition. In one embodiment of the present invention, the dynamic update system 108 allows users to change the value of their existing votes.

Each definition contained on the definition list can have an alternate definition. The dynamic update system 108 receives an alternate definition from the user. The alternate definition is a candidate to replace the existing definition. The dynamic update system 108 first checks to see if the existing definition already has an alternative definition associated with it. Each existing definitions can only have one alternate definition associated with it, so if the existing definition has an assigned definition already, then the request to add a new alternate definition is rejected.

If the slot is available for an alternate definition, then the dynamic update system 108 accepts the definition from the user. Next, the dynamic update system 108 determines whether an exact match exists between the alternate definition and the existing definition. When an exact match exists, the dynamic update system 108 rejects the alternate definition and returns an error message to the user. Otherwise, the dynamic update system 108 verifies that the alternate definition is acceptable (e.g., performs a spell check on text definitions). The dynamic update system then attaches the alternate definition to the existing definition originally selected.

Figure 7:
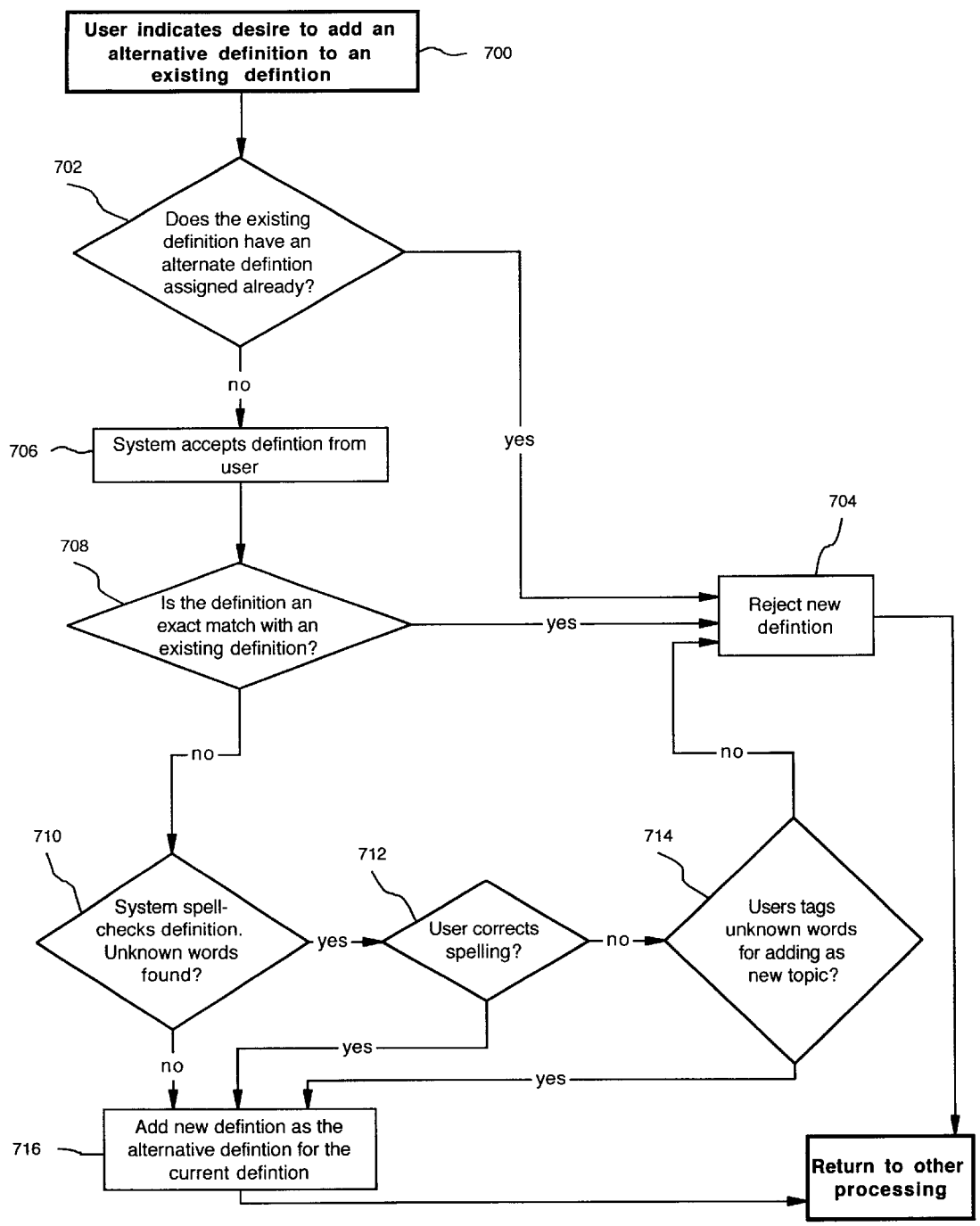
FIG. 7 is a flowchart that illustrates the steps performed by the dynamic update system when receiving an alternate definition in accordance with an embodiment of the present invention.

FIG. 7 is flowchart that illustrates the steps performed by the dynamic update system 108 when receiving an alternate definition, in accordance with an embodiment of the present invention. The flowchart in FIG. 7 assumes that the alternate definition is a text file that contains written definitions. Block 700 represents the dynamic update system 108 receiving an indication from the user that they want to add an alternate definition to an existing definition.

Block 702 is a decision block that represents the dynamic update system 108 determining if the selected existing definition has an alternate definition already associated with it. If the existing definition already has an alternate definition the dynamic update system 108 proceeds to block 704, rejecting the definition. Otherwise, the dynamic update system 108 proceeds to block 706.

Block 706 represents the user entering an alternate definition into the system. When the user has completed entering the new alternate definition, the dynamic update system 108 proceeds to block 708.

Block 708 is a decision block that represents the dynamic update system 108 determining whether there is an exact match between the alternate definition and an existing definition. When an exact match exists, the dynamic update system proceeds to block 704. Block 704 represents the dynamic update system 108 rejecting the new definition. Otherwise, the dynamic update system proceeds to block 710.

Block 710 is another decision block that represents the dynamic update system 108 spell checking the definition. If the spell-check process finds unknown words, then the dynamic update system proceeds to block 712. Otherwise, the dynamic update system proceeds to block 716.

Block 712 is decision block that queries the user, allowing them to correct the spelling of unknown words in the definition. If the user corrects all of the unknown words, then the dynamic update system 108 proceeds to Block 716. Otherwise, the dynamic update system 108 proceeds to block 714.

Block 714 is a decision block that allows the user to tag unknown words for adding as new topics in the system later. If the user does not tag the remaining unknown words to be added as new topics, then the dynamic update system proceeds to block 704, rejecting the definition. Otherwise, the dynamic update system 108 proceeds to block 716.

The dynamic update system 108 then attaches the alternate definition to the originally selected existing definition, as represented by block 716.

As discussed earlier, users submit alternate definitions as candidates to replace the existing definitions. When the alternate definitions pass the replacement threshold 528 (see FIG. 5A), the dynamic update system, replaces the existing definition with the alternate definition.

The replacement threshold 528 has one or more requirements that a definition must fulfill before the dynamic update system 108 replaces the existing definition. When the alternate definition fails to meet these requirements, the dynamic update system 108 does not perform the replacement. The requirements are related to votes that are received from a user.

Returning to FIG. 5A, the alternate definition 522 is a candidate to replace the established definition 504; the alternate definition 524 is a candidate to replace established definition 506; the alternate definition 526 is a candidate to replace established definition 508; the alternate definition 528 is a candidate to replace the fledgling definition 512; the alternate definition 530 is a candidate to replace fledgling definition 506; and the alternate definition 532 is a candidate to replace fledgling definition 516. Specific examples of alternate definitions are shown in FIG. 5B.

Figure 5B:
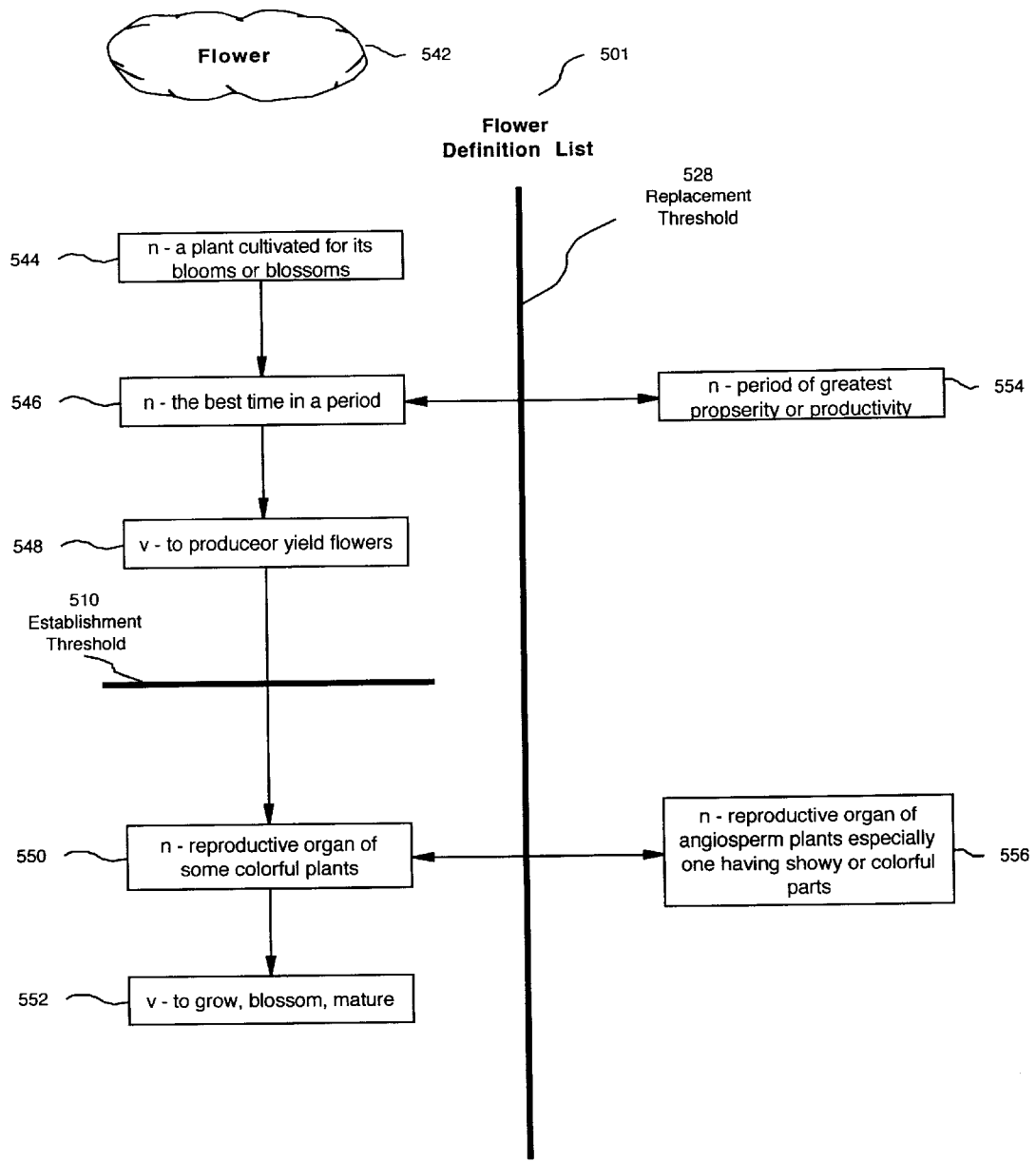

FIG. 5B illustrates a definition list 501 for the topic "flower" 542. The definitions are noun definitions 544, 546, and 550 and verb definitions 548 and 552. The noun definition 546 has an alternate noun definition 554, and the noun definition 550 has an alternate definition 556. The definitions located above the establishment threshold 510 (i.e., noun definitions 544 and 546 and verb definition 548) are preferred by the majority of users who have voted, as defined by the establishment threshold. Similarly, the definitions located to the left of the replacement threshold 528 (i.e., noun definitions 544, 546, and 550 and verb definitions 548 and 552) are preferred by the majority of users who have voted, as defined by the replacement threshold.

In one embodiment of the present invention, the replacement threshold 528 has two requirements. First, an alternate definition must receive a pre-defined number of votes (e.g., 100 total votes). Second, an alternate definition must have a pre-defined percentage of positive votes (e.g., 75% of the votes must be positive votes). When the definition fulfills both requirements, the dynamic update system replaces the existing definition with the alternate definition. Regarding the pre-defined number of votes, the dynamic update system 108 sums the number of votes that each alternate definition receives from users, and compares the total number of votes to the replacement threshold requirement. When the total number of votes is equal to or greater than the first replacement threshold requirement, the dynamic update system 108 checks for the second replacement threshold requirement.

With respect to the second replacement threshold requirement, the dynamic update system 108 tracks the number of positive and negative votes for each alternate definition and calculates the percentage of positive votes. When the pre-defined percentage of positive and negative votes is equal to or greater than the second replacement threshold requirement, the dynamic update system replaces the existing definition with the alternate definition. It is noted that, the majority of users who have voted, as defined by the replacement threshold, prefer the existing definitions (i.e., all definitions located on the left side of the requirement threshold 528) over the alternate definitions.

The following paragraphs describe the voting process for alternate definitions. First, the dynamic update system 108 receives an input. The input is an indication that the user wishes to vote on an existing/alternate definition pair. The dynamic update system 108 displays the corresponding existing definition and alternate definitions—allowing the user to perform a one-to-one comparison between the existing definition and alternate definition. Next, the dynamic update system 108 receives a vote from a user. The received vote is either a positive vote for the existing definition or a positive vote for alternate definition. Once the vote is received, the dynamic update system 108 calculates the total number of votes received by users and, if necessary, replaces the existing definition with user-selected, alternate definition. More specifically, the dynamic update system 108 determines whether the user-selected, alternate definition fulfills the replacement threshold requirements. When the alternate definition fulfills the replacement threshold requirements, the dynamic update system 108 archives the existing definition and then replaces the existing definition with the alternate definition.

Figure 8:
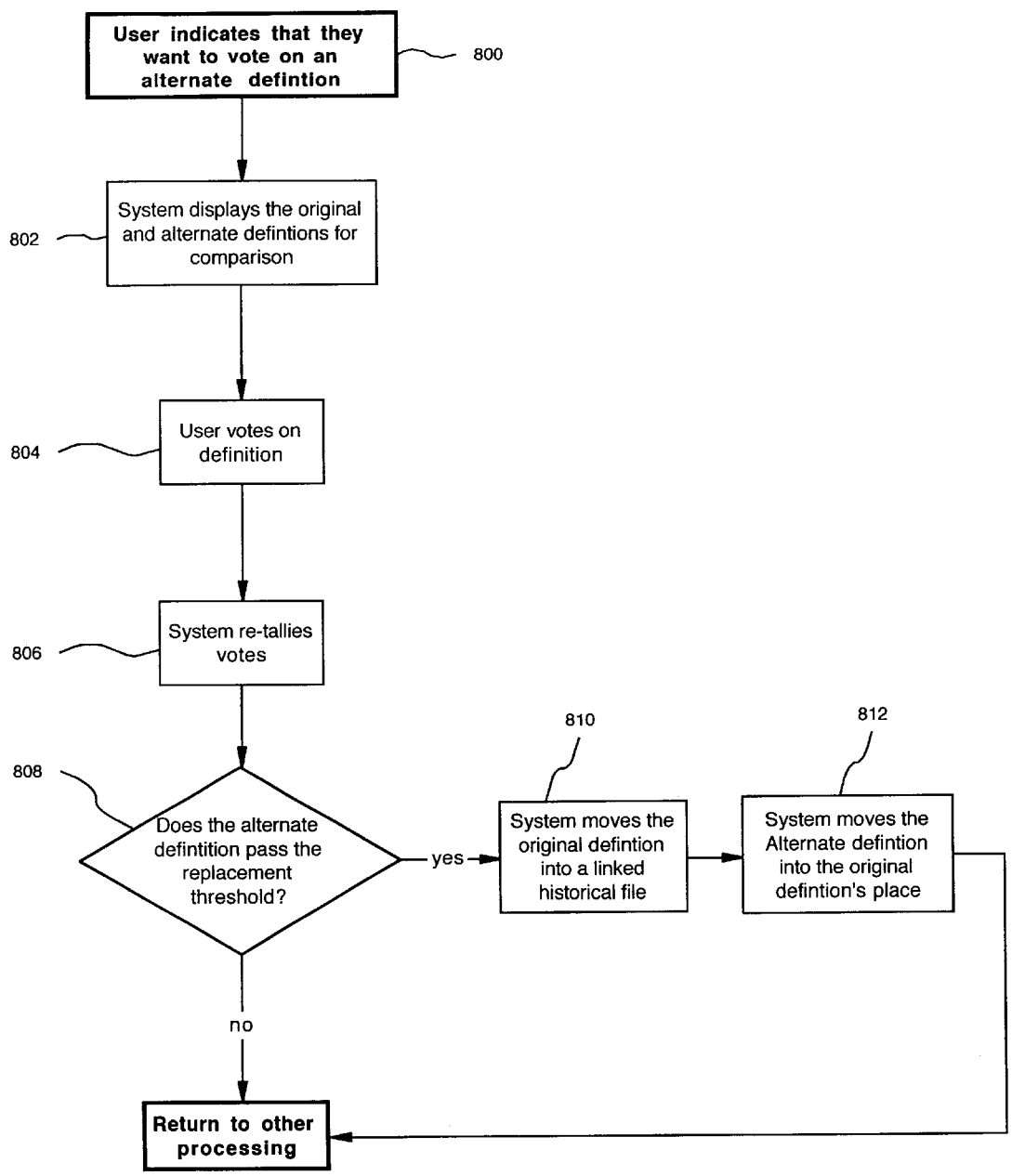
FIG. 8 is a flowchart that illustrates the steps preformed by the dynamic update system when calculating the votes for the user-selected alternate definitions.

FIG. 8 is a flowchart that illustrates the dynamic update system calculating the votes for an alternate definition. Block 800 represents the dynamic update system 108 receiving an input from a user concerning voting on an existing/alternate definition pair. The dynamic update system 108 then displays the corresponding existing definition and alternate definitions—allowing the user to perform a one-to-one comparison between the existing definition and alternate definition., as represented by block 802.

Next, the dynamic update system receives a vote from user, as represented by block 804. Block 806 represents the dynamic update system 108 calculating the votes for the user-selected, alternate definition.

Block 808 is decision block that represents the dynamic update system determining whether the alternate definition passed the replacement threshold requirements. When the alternate definition passes the replacement threshold requirements, the document update system proceeds to block 810. Otherwise it returns to other processing.

Block 810 represents the dynamic update system 108 moving the original established definition into an archive for that definition. Block 812 represents the dynamic update system 108 replacing the existing definition with the alternate definition.

Each definition contained in the definition list has an associated type, such as text, image, audio or video. Of course, other types may be used without exceeding the scope of the present invention. Definitions of a particular type are compared against each other to determine whether the definition is located above or below the establishment threshold 510 (see FIGS. 5A–5B). Similarly, alternate definitions and existing definitions of a particular type are compared against each other. Consequently, the definition list is limited to a particular type of definition. To illustrate, suppose that there are five text definitions, three image definitions, and six audio definitions. The dynamic update system 108 first compares the five text definitions to determine their location on a text only definition list. Next, the dynamic update system 108 compares the three image definitions to determine their location on a image only definition list. Then, the dynamic update system 108 compares the six audio references to determine their location on audio only definition list. In brief, three groups of definition lists exist—text only lists, image only lists, and audio only lists. Each group of lists contains only one type (e.g., text, image, or audio) of definitions.

The definition list is displayed to a user based on the display instructions received from the user. Specifically, in response to the display instructions, the dynamic update system 108 graphically arranges the definitions on the user's monitor screen. For example, in one embodiment of the present invention, the dynamic update system 108 only displays the established definition sub-list (i.e., items that are located above the establishment threshold 510).

In another embodiment of the present invention, the dynamic update system 108 only displays the definitions that are associated with one topic. For instance, assume the word flower is the topic, and assume that the definitions are a noun definition of the word flower, a verb definition of the word flower, and an adjective definition of the word flower. The dynamic update system 108 displays all three definitions, irrespective of whether they are located on the established definition sub-list or the fledgling definition sub-list. In a further embodiment of the present invention, the dynamic update system displays the definition list and the alternate definitions. In an additional embodiment of the present invention, the dynamic update system 108 displays text only lists, image only list or audio only list. To put it differently, definitions of the same type are displayed concurrently and definitions of different types are displayed sequentially.

In brief, the dynamic update system 108 dynamically updates the reference material by incorporating user-defined topics and definitions. In contrast to traditional reference materials, the definition list is not created by a handful of authors. Instead, the topics and the definitions are provided by the users, and hence the reference material is a market driven collection of user-defined topics, definitions, and descriptions.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer method for dynamically updating an on-line collection of reference materials in a database, which comprises the steps of:

dynamically updating a collection of reference materials by incorporating input of new topics, definitions and votes from a plurality of users, without the need for an individual user's approval;

wherein a topic is a term or subject to be defined; wherein a new topic is a topic created by a user;

wherein a definition is one of a plurality of distinct descriptions of a topic; wherein a new definition is a definition created by a user;

wherein a vote is an indication set by a user in favor or against a specific definition; wherein a new vote is a vote created by a user;

wherein an existing definition is a definition of a topic created by a user as a unique definition for a given topic;

wherein an establishment threshold is a set of metrics, wherein the total number of votes cast for a given definition, and a ratio of positive votes to negative votes, that automatically files definitions as fledgling definitions when definitions fall below the establishment threshold and as established definitions when definitions are above the establishment threshold;

wherein a fledgling definition is an existing definition which has not passed the establishment threshold;

wherein an established definition is an existing definition which has passed the establishment threshold;

wherein an alternate definition is a definition of a topic that is created by a user for the purpose of replacing an existing definition; wherein an alternate definition dynamically replaces the intended existing definition only when the replacement threshold is passed; and wherein a replacement threshold is a set of metrics, wherein the total number of votes cast for a given definition, and a ratio of votes cast for the alternate definition versus the number of votes cast for the existing definition, which automatically replaces an existing definition with an alternate definition, when the replacement threshold is passed.

2. The method of claim 1, wherein the collection of reference materials are a collection of text files.

3. The method of claim 1, wherein the collection of reference materials are a collection of multimedia files.

4. The method of claim 1, wherein the input from each user is a new topic.

5. The method of claim 1, wherein the input from each user is a new existing definition.

6. The method of claim 1, wherein the input from each user is a vote.

7. The method of claim 1, wherein dynamically updating the collection of reference materials updates the collection of reference materials during runtime.

8. The method of claim 1, wherein a topic has at least one definition, and wherein the input from each user is a new alternate definition.

9. The method of claim 1, wherein dynamically updating the collection of reference materials further comprises steps of:
   tallying the votes for existing definitions, sorting existing definitions as established definitions or fledgling definitions, depending on whether or not the definition passes the establishment threshold,
   tallying the votes for alternate definitions, and determining if alternate definitions should replace existing definitions by determining if the alternate definitions have passed the replacement threshold.

10. The method of claim 1, wherein the method further comprises the step of displaying definitions of a topic on a display monitor connected to a computer, or other suitable display device.

11. An apparatus for dynamically updating an on-line collection of reference materials in a database, which comprising;
   a computer;
   one or more computer programs, performed by the computer, for providing a collection of reference materials;
   dynamically updating a collection of reference materials by incorporating input of new topics, definitions and votes from a plurality of users, without the need for an individual user's approval
   wherein a topic is a term or subject to be defined; wherein a new topic is a topic created by a user;
   wherein a definition is one of a plurality of distinct descriptions of a topic; wherein a new definition is a definition created by a user;
   wherein a vote is an indication set by a user in favor or against a specific definition; wherein a new vote is a vote created by a user;
   wherein an existing definition is a definition of a topic created by a user as a unique definition for a given topic;
   wherein an establishment threshold is a set of metrics, wherein the total number of votes cast for a given definition, and a ratio of positive votes to negative votes, that automatically files definitions as fledgling definitions when definitions fall below the establishment threshold and as established definitions when definitions are above the establishment threshold;
   wherein a fledgling definition is an existing definition which has not passed the establishment threshold;
   wherein an established definition is an existing definition which has passed the establishment threshold;
   wherein an alternate definition is a definition of a topic that is created by a user for the purpose of replacing an existing definition; wherein an alternate definition dynamically replaces the intended existing definition only when the replacement threshold is passed; and
   wherein a replacement threshold is a set of metrics, wherein the total number of votes cast for a given definition, and a ratio of votes cast for the alternate definition versus the number of votes cast for the existing definition, which automatically replaces an existing definition with an alternate definition, when the replacement threshold is passed.

12. The apparatus of claim 11, wherein the collection of reference materials are a collection of text files.

13. The apparatus of claim 11, wherein the collection of reference materials are a collection of multimedia files.

14. The apparatus of claim 11, wherein the input from each user is a new topic.

15. The apparatus of claim 11, wherein the input from each user is a new existing definition.

16. The apparatus of claim 11, wherein the input from each user is a vote.

17. The apparatus of claim 11, wherein dynamically updating the collection of reference materials updates the collection of reference materials during runtime.

18. The apparatus of claim 11, wherein a topic has at least one definition, and wherein the input from each user is a new alternate definition.

19. The apparatus of claim 11, wherein dynamically updating the collection of reference materials further comprises steps of:
   tallying the votes for existing definitions, sorting existing definitions as established definitions or fledgling definitions, depending on whether or not the definition passes the establishment threshold,
   tallying the votes for alternate definitions, and determining if alternate definitions should replace existing definitions by determining if the alternate definitions have passed the replacement threshold.

20. The apparatus of claim 11, wherein the method further comprises the step of displaying definitions of a topic on a display monitor connected to a computer, or other suitable display device.

21. An article of manufacture comprising a computer program carrier readable by a computer and embodying one or more instructions executable by the computer to perform method steps for dynamically updating an on-line collection of reference materials in a database, comprising:
   dynamically updating a collection of reference materials by incorporating input of new topics, definitions and votes from a plurality of users, without the need for an individual user's approval;
   wherein a topic is a term or subject to be defined; wherein a new topic is a topic created by a user;
   wherein a definition is one of a plurality of distinct descriptions of a topic; wherein a new definition is a definition created by a user;
   wherein a vote is an indication set by a user in favor or against a specific definition; wherein a new vote is a vote created by a user;
   wherein an existing definition is a definition of a topic created by a user as a unique definition for a given topic;
   wherein an establishment threshold is a set of metrics, wherein the total number of votes cast for a given definition, and a ratio of positive votes to negative votes, that automatically files definitions as fledgling definitions when definitions fall below the establishment threshold and as established definitions when definitions are above the establishment threshold;
   wherein a fledgling definition is an existing definition which has not passed the establishment threshold;
   wherein an established definition is an existing definition which has passed the establishment threshold;
   wherein an alternate definition is a definition of a topic that is created by a user for the purpose of replacing an existing definition; wherein an alternate definition dynamically replaces the intended existing definition only when the replacement threshold is passed; and wherein a replacement threshold is a set of metrics, wherein the total number of votes cast for a given definition, and a ratio of votes cast for the alternate definition versus the number of votes cast for the existing definition, which automatically replaces an existing definition with an alternate definition, when the replacement threshold is passed.

22. The article of manufacture of claim 21, wherein the collection of reference materials are a collection of text files.

23. The article of manufacture of claim 21, wherein the collection of reference materials are a collection of multimedia files.

24. The article of manufacture of claim 21, wherein the input from each user is a new topic.

25. The article of manufacture of claim 21, wherein the input from each user is a new existing definition.

26. The article of manufacture of claim 21, wherein the input from each user is a vote.

27. The article of manufacture of claim 21, wherein dynamically updating the collection of reference materials updates the collection of reference materials during runtime.

28. The article of manufacture of claim 21, wherein a topic has at least one definition, and wherein the input from each user is a new alternate definition.

29. The article of manufacture of claim 21, wherein dynamically updating the collection of reference materials further comprises steps of:

tallying the votes for existing definitions, sorting existing definitions as established definitions or fledgling definitions, depending on whether or not the definition passes the establishment threshold, tallying the votes for alternate definitions, and determining if alternate definitions should replace existing definitions by determining if the alternate definitions have passed the replacement threshold.

30. The article of manufacture of claim 21, wherein the method further comprises the step of displaying definitions of a topic on a display monitor connected to a computer, or other suitable display device.

* * * * *